(12) United States Patent
Kim et al.

(10) Patent No.: US 10,932,281 B2
(45) Date of Patent: Feb. 23, 2021

(54) DYNAMIC SCHEDULING METHOD FOR GUARANTEEING QUALITY OF SERVICE DEPENDING ON NETWORK TRANSMISSION TRAFFIC IN LARGE-SCALE IOT ENVIRONMENT AND SYSTEM USING THE SAME

(71) Applicant: ELECTRONICS AND TELECOMMUNICATIONS RESEARCH INSTITUTE, Daejeon (KR)

(72) Inventors: Kyeong-Tae Kim, Daejeon (KR);
Bum-Ho Kim, Daejeon (KR);
Sang-Cheol Kim, Daejeon (KR);
Seon-Tae Kim, Daejeon (KR);
Hae-Yong Kim, Daejeon (KR);
Yu-Seung Ma, Daejeon (KR);
Pyeong-Soo Mah, Daejeon (KR);
Hui-Ung Park, Daejeon (KR);
Duk-Kyun Woo, Daejeon (KR);
Jeong-Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 150 days.

(21) Appl. No.: 16/044,330

(22) Filed: Jul. 24, 2018

(65) Prior Publication Data
US 2019/0037578 A1    Jan. 31, 2019

(30) Foreign Application Priority Data

Jul. 25, 2017   (KR) .......................... 10-2017-0094116

(51) Int. Cl.
*H04W 72/12*    (2009.01)
*H04W 72/04*    (2009.01)
(Continued)

(52) U.S. Cl.
CPC ........... *H04W 72/12* (2013.01); *H04L 43/045* (2013.01); *H04W 72/0446* (2013.01);
(Continued)

(58) Field of Classification Search
None
See application file for complete search history.

(56) References Cited

U.S. PATENT DOCUMENTS

| | | |
|---|---|---|
| 8,331,311 B2 | 12/2012 | Lee et al. |
| 2009/0003289 A1* | 1/2009 | Sugaya ............... H04W 56/002 370/336 |

(Continued)

FOREIGN PATENT DOCUMENTS

| | | |
|---|---|---|
| KR | 10-1217813 B1 | 1/2013 |
| KR | 10-1255228 B1 | 4/2013 |

(Continued)

OTHER PUBLICATIONS

Yafeng Wu et al., "Realistic and Efficient Multi-Channel Communications in Wireless Sensor Networks", IEEE Infocom 2008—The 27th Conference on Computer Communications, 2008, pp. 1867-1875, IEEE.

*Primary Examiner* — Mohammad S Adhami

(57) ABSTRACT

Disclosed herein are a dynamic scheduling method for guaranteeing Quality of Service QoS depending on network transmission traffic and a system using the same. The dynamic scheduling method includes assigning communication channels to respective nodes based on Identifications (IDs) of parent nodes corresponding to the respective nodes, setting priorities for assignment of time slots to the respec-
(Continued)

tive nodes in each quarter based on data traffic volumes corresponding to the respective nodes, and assigning time slots to the respective nodes in each quarter depending on the set priorities for assignment of the time slots.

17 Claims, 14 Drawing Sheets

(51) Int. Cl.
    *H04L 12/26*     (2006.01)
    *H04W 72/10*     (2009.01)
    *H04W 72/08*     (2009.01)
    *H04W 84/18*     (2009.01)

(52) U.S. Cl.
    CPC ......... *H04W 72/085* (2013.01); *H04W 72/10* (2013.01); *H04W 72/1247* (2013.01); *H04W 72/1236* (2013.01); *H04W 72/1252* (2013.01); *H04W 84/18* (2013.01)

(56) References Cited

U.S. PATENT DOCUMENTS

| | | | |
|---|---|---|---|
| 2009/0207769 A1* | 8/2009 | Park | H04W 74/04 370/311 |
| 2011/0051710 A1* | 3/2011 | Chintalapudi | H04W 74/0841 370/345 |
| 2015/0049644 A1* | 2/2015 | Lee | H04W 84/20 370/256 |
| 2018/0288782 A1* | 10/2018 | Kim | H04W 72/121 |
| 2018/0302911 A1* | 10/2018 | Aijaz | H04W 72/085 |

FOREIGN PATENT DOCUMENTS

| | | |
|---|---|---|
| WO | 2016014331 A1 | 1/2016 |
| WO | 2017004353 A1 | 1/2017 |

\* cited by examiner

| Ch \ TS | QUARTER 1 | | | QUARTER 2 | | | QUARTER 3 | | |
|---|---|---|---|---|---|---|---|---|---|
| | 1 | 2 | 3 | 4 | 5 | 6 | 7 | 8 | 9 |
| 1 | 2 | 3 | 4 | 2 | 3 | 4 | 2 | | 2 |
| 2 | | 5 | | | 5 | | | 5 | |
| 5 | 8 | | | 8 | | | | | |
| 3 | 6 | | | | | | | | |
| 4 | 7 | | | | | | | | |
| 8 | | 9 | | | | | | | |

SLOT FRAME LENGTH

FIG. 4

QUARTER 1

| TS<br>Ch | 1 | 2 | 3 |
|---|---|---|---|
| 1 | 2 | 3 | 4 |
| 2 |   | 5 | 18 |
| 3 | 6 |   |   |
| 5 | 8,22 |   |   |
| 6 |   | 21 |   |
| 4 | 7 |   |   |
| 8 |   | 9 |   |

FIG. 9

| | QUARTER 1 | | | | QUARTER 2 | | | | QUARTER 3 | | | QUARTER 4 | | QUARTER 5 |
|---|---|---|---|---|---|---|---|---|---|---|---|---|---|---|
| TS / Ch | 1 | 2 | 3 | 4 | 5 | 6 | 7 | 8 | 9 | 10 | 11 | 12 | 13 | 14 |
| 1 | 2 | 3 | 4 | | 2 | 3 | 4 | | 2 | 3 | | 2 | 3 | 2 |
| 2 | | 5 | 18 | | | 5 | | | | 5 | | | | |
| 3 | 6 | | | | 6 | | | | 6 | | | | | |
| 5 | 8 | | 22 | | 8 | | | | | | | | | |
| 6 | | 21 | | | | 21 | | | | | | | | |
| 4 | 7 | | | | | | | | | | | | | |
| 8 | | 9 | | | | | | | | | | | | |

FIG. 10

|              | QUARTER 1 |   |   |   | QUARTER 2 |   |   |   | QUARTER 3 |    |    | QUARTER 4 |    | QUARTER 5 |
|--------------|---|---|----|---|---|---|---|---|---|----|----|----|----|----|
| TS \ Ch      | 1 | 2 | 3  | 4 | 5 | 6 | 7 | 8 | 9 | 10 | 11 | 12 | 13 | 14 |
| 1            | 2 | 3 | 4  |   | 2 | 3 | 4 |   | 2 | 3  |    | 2  | 3  | 2  |
| 2            | 22 | 5 | 18 |   |   | 5 |   |   |   | 5  |    |    |    |    |
| 3            | 6 |   |    |   | 6 |   |   |   | 6 |    |    |    |    |    |
| 5            | 8 |   |    |   | 8 |   |   |   |   |    |    |    |    |    |
| 6            |   | 21 |   |   |   | 21 |  |   |   |    |    |    |    |    |
| 4            | 7 |   |    |   |   |   |   |   |   |    |    |    |    |    |
| 8            | 9 |   |    |   |   |   |   |   |   |    |    |    |    |    |

FIG. 11

SLOT FRAME LENGTH

| TS\Ch | 1 | 2 | 3 | 4 | 5 | 6 | 7 | 8 | 9 | 10 | 11 | 12 | ... | 16 | ... |
|---|---|---|---|---|---|---|---|---|---|---|---|---|---|---|---|
| | QUARTER 1 | | | | QUARTER 2 | | | | QUARTER 3 | | | QUARTER EB | | QUARTER BR | |
| 1 | 2 | 3 | 4 | | 2 | 3 | 4 | | 2 | | 2 | EB | EB | | |
| 2 | | 5 | 18 | | | 5 | | | | 5 | | EB | (EB)–BR | | |
| 5 | 8 | | | | 8 | | | | | | | EB | EB | | |
| 3 | 6 | | | | | | | | | | | EB | EB | | |
| 4 | 7 | | | | | | | | | | | EB | EB | | |
| 8 | | 9 | | | | | | | | | | EB | EB | | |

FIG. 12

DYNAMIC SCHEDULING METHOD FOR GUARANTEEING QUALITY OF SERVICE DEPENDING ON NETWORK TRANSMISSION TRAFFIC IN LARGE-SCALE IOT ENVIRONMENT AND SYSTEM USING THE SAME

CROSS REFERENCE TO RELATED APPLICATION

This application claims the benefit of Korean Patent Application No. 10-2017-0094116, filed Jul. 25, 2017, which is hereby incorporated by reference in its entirety into this application.

BACKGROUND OF THE INVENTION

1. Technical Field

The present invention relates to a dynamic scheduling method for guaranteeing Quality of Service (QoS) depending on network transmission traffic in a large-scale Internet of Things (IoT) environment and to a system using the dynamic scheduling method.

2. Description of the Related Art

Wireless sensor network technology for industrial Internet of Things (IoT) applications includes standards, such as Zigbee, an International Society of Automation (ISA) 100.11a standard, and a Wireless sensor networking technology based on the Highway Addressable Remote Transducer protocol (WirelessHART) standard, which define high-level communication protocols suitable for the requirements of related industries based on an Institute of Electrical and Electronics Engineers (IEEE) 802.15.4 standard which is a Wireless Personal Area Network (WPAN) transmission standard.

The IEEE 802.15.4 standard, which is proposed for low-power, low-cost, and short-range wireless networks, has problems, such as a transmission delay, limitation in security of reliability, limited peer-to-peer communication, and the absence of a low-power operation method suitable for various qualities of service. Therefore, recently, in order to solve problems with existing IEEE 802.15.4 technology in consideration of requirements of the International Telecommunication Union Radiocommunication Sector (ITU-R) M.2002/M.2224 and to satisfy a communication range of 1 km or more, reliable communication in a shadow area, low-power implementation for a battery lifespan of 10 or more years, and minimum infrastructure technology requirements, a Weightless v1.0 standard, IEEE 802 15.4e, g, k standards, etc. have been completely established, and 15.4 m and 15.8 standards and the like are under discussion.

In the IEEE 802.15.4e standard, a Media Access Control (MAC) template for transmitting/receiving data using Time-Slotted Channel Hopping (TSCH) technology has been standardized. However, a scheduling algorithm, which indicates the number of a time slot in which, and the number of a frequency channel through which, each node communicates with a parent node thereof in a periodically repeating cycle, is not presented. Accordingly, the Internet Engineering Task Force (IETF) has conducted research into TSCH-based communication scheduling through IPv6 over the TSCH mode of IEEE 802.15.4e (6TiSCH) Working group since 2013, and is proposing a 6TiSCH Operation Sublayer (6top) protocol for two-way scheduling negotiation in the form of a draft.

However, in order to satisfy various QoS requirements (e.g. transmission delay time, transmission success rate, duty cycle for low power consumption, etc.) of industrial IoT, a dynamic scheduling method depending on data traffic and network topology is needed. In connection with this, Korean Patent No. 10-1217813 discloses a technology related to "Method to determine priority of data transmission in wireless network".

The above-described background technology is technological information that was possessed by the present applicant to devise the present invention or that was acquired by the present applicant during the course of devising the present invention, and thus such information cannot be construed to be known technology that was open to the public before the filing of the present invention.

SUMMARY OF THE INVENTION

Accordingly, the present invention has been made keeping in mind the above problems occurring in the prior art, and an object of the present invention is to provide a coloring-based dynamic distributed scheduling method and a system using the method, which can remove collisions and interference when a large number of multi-hop nodes configured in a large-scale IoT environment desire to transmit data to a root node, and can satisfy various QoS requirements of industrial IoT.

Another object of the present invention is to provide a coloring-based dynamic distributed scheduling method and a system using the method, which can satisfy various QoS requirements by dividing quarters according to the amount of network transmission traffic while avoiding collisions and interference, occurring in transmission, and transmitting data without overlapping by separating time and channels based on coloring.

In accordance with an aspect of the present invention to accomplish the above objects, there is provided a dynamic scheduling method for guaranteeing Quality of Service (QoS) depending on network transmission traffic, including assigning communication channels to respective nodes based on Identifications (IDs) of parent nodes corresponding to the respective nodes; setting priorities for assignment of time slots to the respective nodes in each quarter based on data traffic volumes corresponding to the respective nodes; and assigning time slots to the respective nodes in each quarter depending on the set priorities for assignment of the time slots.

Assigning the time slots may be configured to assign the time slots such that a collision between neighboring communication channels does not occur by applying graph coloring to the communication channels.

Assigning the time slots may be configured to sequentially determine, for a target node, whether a communication collision with the target node occurs in multiple time slots from a first time slot in a target quarter, and to assign an earliest time slot in which a collision does not occur to the target node.

The dynamic scheduling method may further include when two or more target nodes interfere with each other using an identical channel in an identical time slot in an identical target quarter, changing and assigning one or more of communication channels and time slots that are assigned to the interfering target nodes.

The target quarter may include one or more spare time slots for avoiding interference, and changing and assigning the one or more of the communication channels and the time slots may be configured to assign different time slots to the interfering target nodes using the spare time slots.

Changing and assigning the one or more of the communication channels and the time slots may be configured to, when two or more target nodes interfere with each other using an identical channel in an identical time slot in an identical target quarter, assign different communication channels to the interfering target nodes.

Changing and assigning the one or more of the communication channels and the time slots may be configured to, when the different communication channels are assigned to the interfering target nodes, assign different communication channels to the interfering target nodes using communication channels other than existing communication channels of the interfering target nodes and existing communication channels of parent nodes of the interfering target nodes.

The dynamic scheduling method may further include assigning communication channels to respective nodes so as to receive an Enhanced Beacon (EB) message in a quarter EB interval, separate from existing quarters in which data is transmitted; allowing each of the nodes to receive an EB message from a parent node corresponding thereto; and when information, indicating that there is data to be transmitted in a quarter Broadcast (BR) interval, is included in the EB message, receiving broadcast data corresponding to the data to be transmitted in the quarter BR interval.

Setting the priorities for assignment of time slots may be configured to set a priority for assignment of time slots to a higher level as a data traffic volume corresponding to each node is larger.

Assigning the time slots may be configured to assign the time slots such that each node performs transmission once or less in each quarter.

In accordance with another aspect of the present invention to accomplish the above objects, there is provided a system using a dynamic scheduling method for guaranteeing Quality of Service (QoS) depending on network transmission traffic, wherein the dynamic scheduling method is configured to assigning communication channels to respective nodes based on Identifications (IDs) of parent nodes corresponding to the respective nodes, setting priorities for assignment of time slots to the respective nodes in each quarter based on data traffic volumes corresponding to the respective nodes, and assigning time slots to the respective nodes in each quarter depending on the set priorities for assignment of the time slots.

The time slots may be assigned such that a collision between neighboring communication channels does not occur by applying graph coloring to the communication channels.

The time slots may be assigned by sequentially determining, for a target node, whether a communication collision with the target node occurs in multiple time slots from a first time slot in a target quarter, and by assigning an earliest time slot in which a collision does not occur to the target node.

The dynamic scheduling method may be configured to, when two or more target nodes interfere with each other using an identical channel in an identical time slot in an identical target quarter, change and assign one or more of communication channels and time slots that are assigned to the interfering target nodes.

The target quarter may include one or more spare time slots for avoiding interference, and the dynamic scheduling method may be configured to assign different time slots to the interfering target nodes using the spare time slots.

The dynamic scheduling method may be configured to, when two or more target nodes interfere with each other using an identical channel in an identical time slot in an identical target quarter, assign different communication channels to the interfering target nodes.

The dynamic scheduling method may be configured to, when the different communication channels are assigned to the interfering target nodes, assign different communication channels to the interfering target nodes using communication channels other than existing communication channels of the interfering target nodes and existing communication channels of parent nodes of the interfering target nodes.

The dynamic scheduling method may be configured to assign communication channels to respective nodes so as to receive an Enhanced Beacon (EB) message in a quarter EB interval, separate from existing quarters in which data is transmitted, allow each of the nodes to receive an EB message from a parent node corresponding thereto, and when information, indicating that there is data to be transmitted in a quarter Broadcast (BR) interval, is included in the EB message, receive broadcast data corresponding to the data to be transmitted in the quarter BR interval.

The priorities for assignment of time slots may be set such that a priority for assignment of time slots is set to a higher level as a data traffic volume corresponding to each node is larger.

The time slots may be assigned such that each node performs transmission once or less in each quarter.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram illustrating an example in which the system using a dynamic scheduling method for guaranteeing QoS depending on network transmission traffic, illustrated in FIG. 3, assigns time slots in respective quarters;

FIGS. 8 and 9 are diagrams illustrating a system using a dynamic scheduling method for guaranteeing QoS depending on network transmission traffic according to another embodiment of the present invention and a data transmission schedule based on the system;

FIG. 10 is a diagram illustrating an example in which the system using a dynamic scheduling method for guaranteeing QoS depending on network transmission traffic, illustrated in FIGS. 8 and 9, avoids interference and performs scheduling;

FIG. 11 is a diagram illustrating another example in which the system using a dynamic scheduling method for guaranteeing QoS depending on network transmission traffic, illustrated in FIGS. 8 and 9, avoids interference and performs scheduling;

FIG. 12 is a diagram illustrating a method in which the system using a dynamic scheduling method for guaranteeing QoS depending on network transmission traffic, illustrated in FIG. 1, sends an Enhanced Beacon (EB) message and Broadcast (BR) data;

DESCRIPTION OF THE PREFERRED EMBODIMENTS

Figure 1:
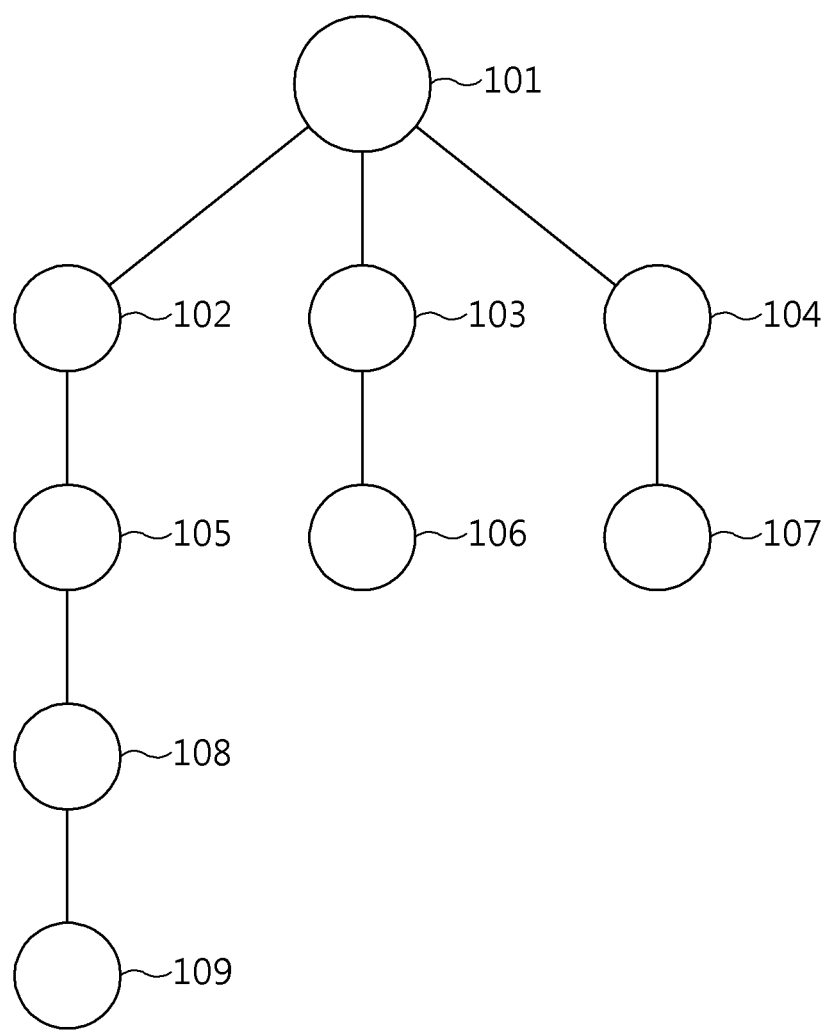
FIG. 1 is a diagram illustrating a system using a dynamic scheduling method for guaranteeing Quality of Service (QoS) depending on network transmission traffic according to an embodiment of the present invention.

The present invention may be variously changed, and may have various embodiments, and specific embodiments will be described in detail below with reference to the attached drawings. The advantages and features of the present invention and methods for achieving them will be more clearly understood from the following detailed description taken in conjunction with the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

However, the present invention is not limited to the following embodiments, but some or all of the following embodiments can be selectively combined and configured so that various modifications are possible. In the following embodiments, terms such as "first" and "second" are not intended to restrict the meanings of components, and are merely intended to distinguish one component from other components. A singular expression includes a plural expression unless a description to the contrary is specifically pointed out in context. In the present specification, it should be understood that terms such as "include" or "have" are merely intended to indicate that features or components described in the present specification are present, and are not intended to exclude the possibility that one or more other features or components will be present or added.

Embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a diagram illustrating a system 1 using a dynamic scheduling method for guaranteeing Quality of Service (QoS) depending on network transmission traffic according to an embodiment of the present invention.

Referring to FIG. 1, the system 1 using a dynamic scheduling method for guaranteeing QoS depending on network transmission traffic according to the embodiment of the present invention has a tree-structured routing path in which communication devices 102 to 109, which use the dynamic scheduling method for guaranteeing QoS depending on network transmission traffic in an IEEE 802.15.4-based network, transmit data to a root node (top-level node) 101. Here, the process in which respective nodes transmit data to their parent nodes and the parent nodes transmit the data to their parent nodes may be repeated, and thus the root node 101 may finally receive all data.

However, when a large number of nodes configured in a large-scale IoT environment desire to simultaneously transmit data to the root node, a problem may occur in operating a network for guaranteeing QoS due to collisions or interference between the nodes.

Here, requirements for QoS may include a transmission delay time, a transmission success rate, a duty cycle for low power consumption, etc.

Here, the system 1 using a dynamic scheduling method for guaranteeing QoS depending on network transmission traffic avoids collisions and interference that may occur in data transmission through data transmission scheduling, in which time and channels are separated based on coloring, in order to guarantee QoS in a large-scale IoT environment.

In detail, the system 1 using a dynamic scheduling method for guaranteeing QoS depending on network transmission traffic may assign transmission channels based on receivers (parent nodes) (i.e. receiver-based channel assignment) to respective communication devices 102 to 109, which use the dynamic scheduling method for guaranteeing QoS depending on network transmission traffic, in order to diversify channels, may establish quarters (regions) after the receiver-based channel assignment, may perform time slot coloring, may determine priorities for time slot assignment based on the data traffic volumes of respective nodes, may assign time slots within each quarter depending on the determined priorities for time slot assignment, and may transmit data using the assigned time slots and transmission channels.

Here, the transmission channels of respective nodes may be assigned based on the IDs of parent nodes corresponding thereto.

For example, when the ID of the parent node 101 is 1, the child nodes 102 to 104 may assign transmission channels to '1', which is the ID of the parent node 101.

Here, the data traffic volume of a specific node may mean the sum of the amount of data that is received from descendant nodes and is to be transmitted to the root node and the amount of data that is to be transmitted from the specific node to the root node.

For example, the data traffic volume of the node 102 may be '4', obtained by summing a data volume of 3, which is transmitted from the nodes 105, 108, and 109, which are descendant nodes thereof, and a data volume of 1 of the node 102 itself.

Here, the larger the data traffic volume, the higher the priority for time slot assignment that may be set in each quarter.

In particular, the largest data traffic volume may be the total number of quarters.

Here a time slot may be assigned once to each of the nodes within each quarter.

Accordingly, each node may transfer data received from a descendant node thereof to a parent node thereof once within each quarter, or alternatively, the node may transmit its own data to the parent node when there is no data received from a descendant node, thus minimizing a transmission delay and sequentially transmitting data.

Also, since a minimum number of time slots are assigned and used to transmit and receive data, a duty cycle may be minimized, and thus power consumption may also be minimized.

Figure 2:
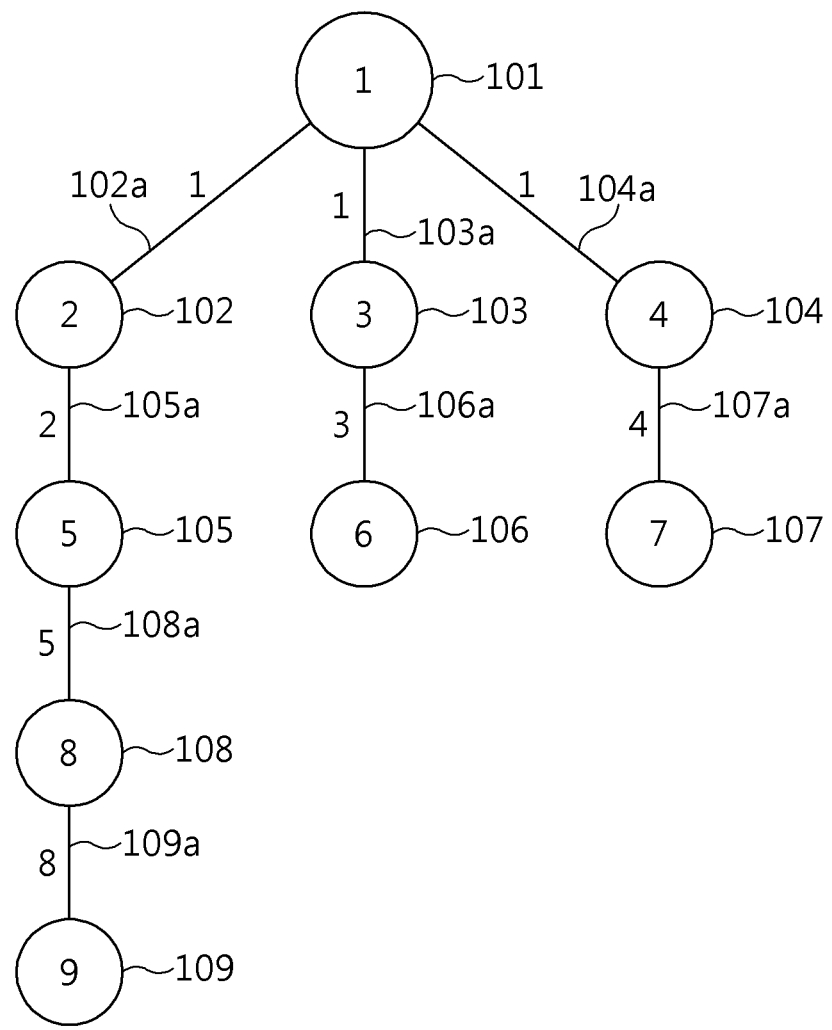
FIG. 2 is a diagram illustrating an example in which the system using a dynamic scheduling method for guaranteeing QoS depending on network transmission traffic, illustrated in FIG. 1, assigns communication channels.

FIG. 2 is a diagram illustrating an example in which the system 1 using a dynamic scheduling method for guaranteeing QoS depending on network transmission traffic, illustrated in FIG. 1, assigns communication channels.

Referring to FIG. 2, the system 1 using a dynamic scheduling method for guaranteeing QoS depending on network transmission traffic according to the embodiment of the present invention has a tree-structured routing path in which communication devices 102 to 109, which use the dynamic scheduling method for guaranteeing QoS depending on network transmission traffic in an IEEE 802.15.4-based network, transmit data to a root node 101.

Here, node 9 109 has node 8 108 as a parent node, the node 8 108 has node 5 105 as a parent node, the node 5 105 has node 2 102 as a parent node, and the node 2 102 has the node 1 (root node) 101 as a parent node. Also, node 6 106 has node 3 103 as a parent node and the node 3 103 has the root node 1 101 as a parent node. Further, node 7 107 has node 4 104 as a parent node and the node 4 104 has the root node 1 101 as a parent node.

The ID of node M is M. For example, the ID of the node 1 is 1 and the ID of the node 2 is 2. The numeral in each node of FIG. 2 may mean the ID of the corresponding node.

When transmission channels are assigned to respective nodes 101 to 109, the transmission channels may be assigned based on the IDs of parent nodes thereof.

When a transmission channel is assigned to a corresponding one of the nodes 101 to 109, the transmission channel having a channel number identical to the ID of a parent node of the corresponding node may be assigned. When the ID of the parent node is equal to or greater than the total number of channels N, the transmission channel may be replaced with a channel having a channel number corresponding to the remainder that is obtained when the ID of the parent node is divided by N.

Here, referring to the IEEE 802.15.4 standard, the total number of channels is 16, and thus there may be channels from #0 to #15.

That is, the ID of the node 8 108, which is the parent node of the node 9 109, is 8, and thus channel #8 may be assigned as the transmission channel 109a of the node 9 109. Similarly, channel #5 may be assigned as the transmission channel 108a of the node 8 108, channel #2 may be assigned as the transmission channel 105a of the node 5 105, channel #1 may be assigned as the transmission channel 102a of the node 2 102, channel #3 may be assigned as the transmission channel 106a of the node 6 106, the channel #1 may be assigned as the transmission channel 103a of the node 3 103, channel #4 may be assigned as the transmission channel 107a of the node 7 107, and the channel #1 may be assigned as the transmission channel 104a of the node 4 104. Here, numerals indicated on the left side of lines indicating transmission channels between respective nodes of FIG. 2 may mean channel numbers of the corresponding transmission channels.

Here, as the transmission channels 102a to 104a, the channel #1 is equally assigned to the node 2 102, the node 3 103, and the node 4 104. Therefore, in order to prevent collisions from occurring due to the use of the same transmission channel, there is a need to schedule data transmission by assigning time slots.

Figure 3:
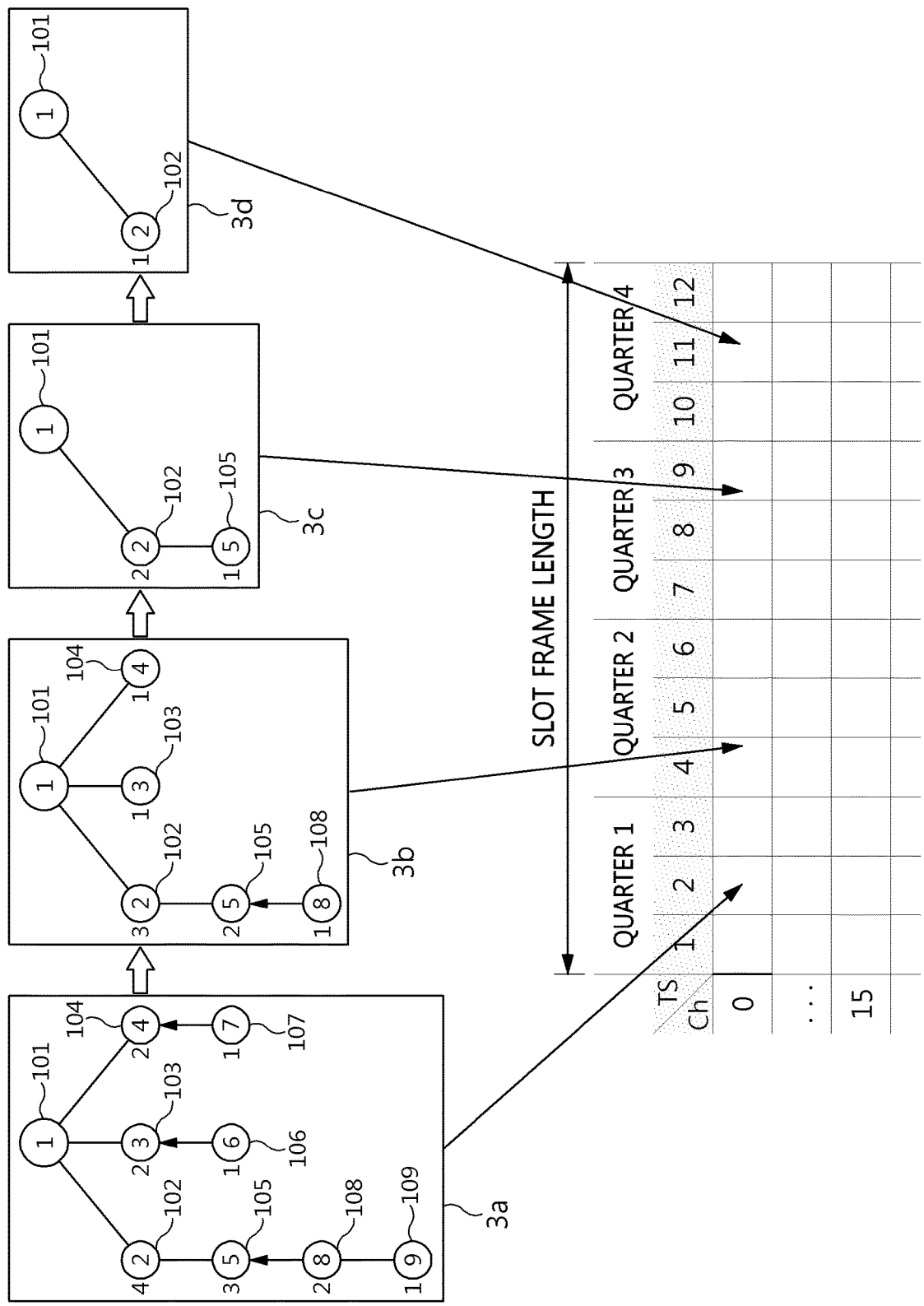
FIG. 3 is a diagram illustrating an example in which the system using a dynamic scheduling method for guaranteeing QoS depending on network transmission traffic, illustrated in FIG. 2, transmits pieces of data in respective quarters.

FIG. 3 is a diagram illustrating an example in which the system 1 using a dynamic scheduling method for guaranteeing QoS depending on network transmission traffic, illustrated in FIG. 2, transmits pieces of data in respective quarters.

Referring to FIG. 3, the system 1 using a dynamic scheduling method for guaranteeing QoS depending on network transmission traffic, illustrated in FIG. 2, assigns transmission channels based on the IDs of parent nodes to respective descendant nodes 102 to 109. However, since the number of channels is limited, there is a need to assign time slots in each quarter so as to avoid collisions between channels.

Here, a node ID is indicated in each node of FIG. 3, and a data traffic volume is indicated on the left side of the corresponding node, wherein the data traffic volume is the sum of a data volume that is received from descendant nodes and is to be transmitted to the root node and a data volume that is to be transmitted from the corresponding node to the root node.

That is, the data traffic volume of the node 2 102 is 4, the data traffic volume of the node 5 105 is 3, the data traffic volumes of the node 3 103, the node 4 104, and the node 8 108 are 2, and the data traffic volumes of the node 6 106, the node 7 107, and the node 9 109 are 1.

Here, in each quarter, the nodes 102 to 109 may transmit data once.

Further, the number of quarters may be the largest data traffic volume, among data traffic volumes corresponding to respective nodes.

That is, the data traffic volume of the node 2 102 is 4, which is the largest data traffic volume, and thus the total number of quarters may be 4.

Since all nodes perform data transmission once in each quarter, data volumes to be transmitted by leaf nodes having a data volume other than 0 may consequently be '0'. In order to simplify and represent this situation, nodes having a data volume of 0 to be transmitted may be excluded from illustration in the drawing.

For example, all nodes transmit data to parent nodes thereof once in quarter 1 (3a), and thus the leaf nodes in the quarter 1, that is, the node 6 106, the node 7 107, and the node 9 109, may have a data volume of 0 to be transmitted in quarter 2. Further, after the quarter 1 has passed, in the quarter 2, the node 2 102 may have a data traffic volume of 3, the node 5 105 may have a data traffic volume of 2, and the node 3 103, the node 4 104, and the node 8 108 may have a data traffic volume of 1.

Further, all nodes transmit data to parent nodes thereof once in quarter 2 (3b), and thus the leaf nodes in the quarter 2, that is, the node 3 103, the node 4 104, and the node 8 108, may have a data volume of 0 to be transmitted in quarter 3. Also, after the quarter 2 has passed, in the quarter 3, the node 2 102 may have a data traffic volume of 2, and the node 5 105 may have a data traffic volume of 1.

Furthermore, all nodes transmit data to parent nodes thereof once in the quarter 3 (3c), and thus a leaf node in the quarter 3, that is, the node 5 105, may have a data traffic volume of 0 to be transmitted in quarter 4. Further, after the quarter 3 has passed, in the quarter 4, the node 2 102 may have a data traffic volume of 1.

Here, when graph coloring is applied to respective transmission channels of the nodes, time slots may be separated using a total of three colors, and thus three time slots may be assigned in each quarter. Further, all nodes may transmit data using three time slots in each quarter.

FIG. 4 is a diagram illustrating an example in which the system 1 using a dynamic scheduling method for guaranteeing QoS depending on network transmission traffic, illustrated in FIG. 3, assigns time slots in respective quarters.

Referring to FIG. 4, the system 1 using a dynamic scheduling method for guaranteeing QoS depending on network transmission traffic assigns time slots so that data may be transmitted through quarter-based coloring without causing collisions or interference in each quarter.

In this case, the assignment of time slots may be performed using a method such as that given in the following pseudo-code 1:

---
[Pseudo-code 1]
---
```
repeat
    while(interference(u,t)==0 && interference(parent(u),t)==0)
        t -> t+1
    end while
    if(conflict(u)==0)
        schedule to send
    else
        if(t<quarter_bound)
            t -> t+1
        else
            change the channel
            t -> t+1
```
--- until node (u) is scheduled

In the above pseudo-code 1, interference (u,t) indicates whether interference with a neighboring node occurs when node u transmits data in time slot t, parent (u) indicates a parent node of the node u, conflict (u) indicates whether a conflict (collision) in data transmission/reception occurs when the node u transmits data, and quarter_bound indicates the maximum number of time slots assigned in each quarter.

FIG. 4 illustrates scheduling realized such that nine time slots and six channels are distributed and assigned to a total of nine nodes in the system 1 using a dynamic scheduling method for guaranteeing QoS depending on network transmission traffic, illustrated in FIG. 3, thus enabling data to be transmitted without causing collisions or interference. In particular, in FIG. 4, data transmission is scheduled such that, in order to optimize scheduling, quarter 4 is omitted and all data transmission tasks are terminated in quarter 3. Although data aggregation is not described here, further optimized scheduling may be performed if such data aggregation is used.

The larger the data traffic volume, the higher the priority for time slot assignment that may be set in each quarter.

Here, when the priority for time slot assignment is set depending on the data traffic volume, the priority that is assigned may become higher in the sequence of the node 2, the node 5, the node 3, the node 4, the node 8, the node 6, the node 7, and the node 9.

That is, channel #1 may be assigned to the node 2, and time slot #1 may be assigned to the node 2 because there is neither a collision nor interference with other channels. Channel #2 is assigned to the node 5, but time slot #2 may be assigned to the node 5 due to the problem of a collision with the node 2. The channel #1 may be assigned to the node 3, and the time slot #2 may be assigned to the node 3 due to the problem of a collision with the node 2. The channel #1 may be assigned to node 4, and time slot #3 may be assigned to the node 4 due to the problem of a collision with the node 2 and the node 3. Channel #5 may be assigned to the node 8, and the time slot #1 may be assigned to the node 8 because there is no problem of a collision with other nodes. The channel #3 may be assigned to the node 6, and the time slot #1 may be assigned to the node 6 because there is no problem of a collision with other nodes. Channel #4 may be assigned to the node 7, and the time slot #1 may be assigned to the node 7 because there is no problem of a collision with other nodes. Channel #8 may be assigned to the node 9, and the time slot #2 may be assigned to the node 9 due to the problem of a collision with the node 8.

In this way, since the time slots are assigned based on coloring, all nodes can transmit data using only a minimum number of time slots, and thus a transmission delay may be minimized.

Figure 5:
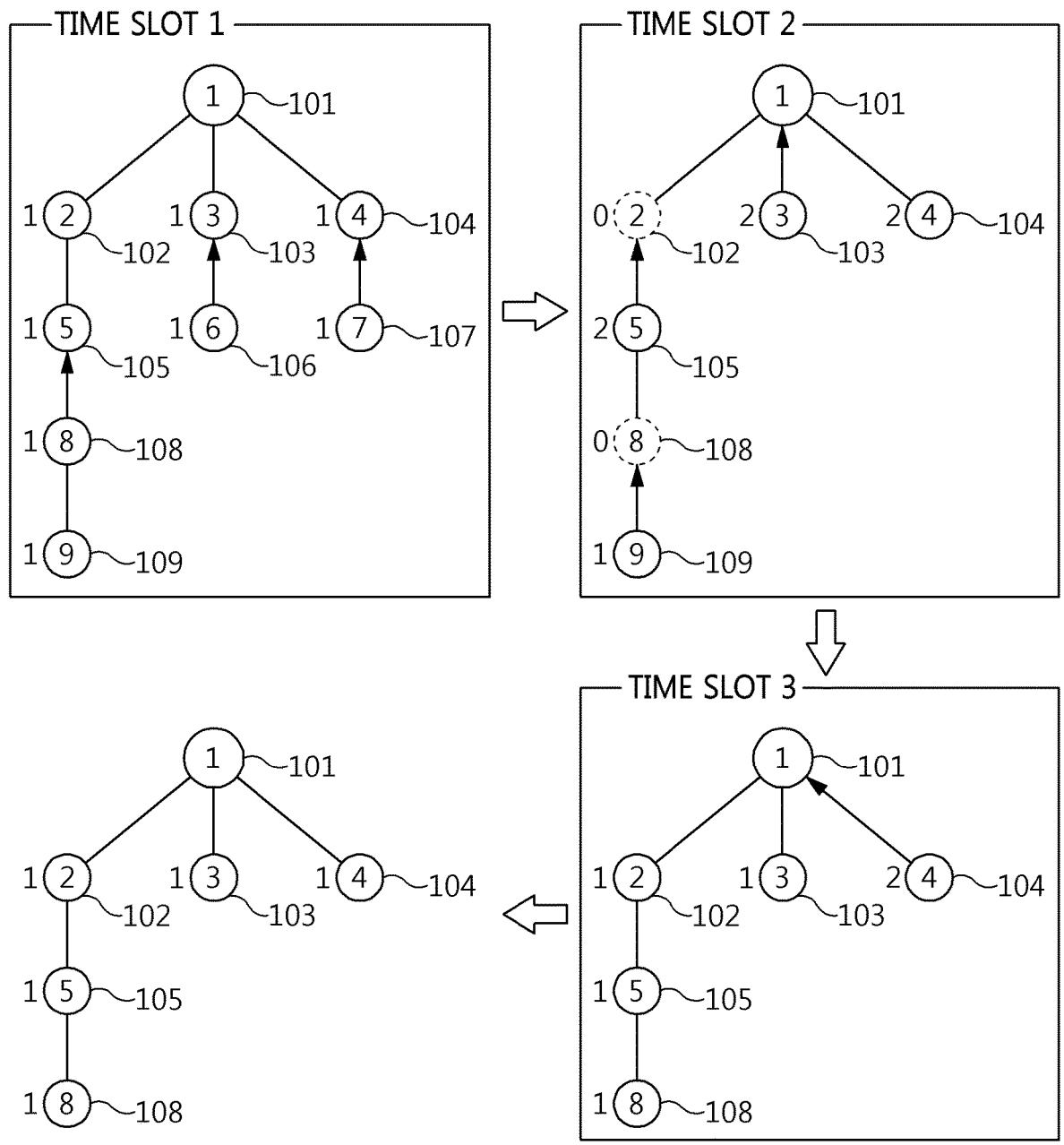
FIGS. 5 to 7 are diagrams illustrating a procedure for transmitting data depending on the schedule illustrated in FIG. 4.
Figure 6:
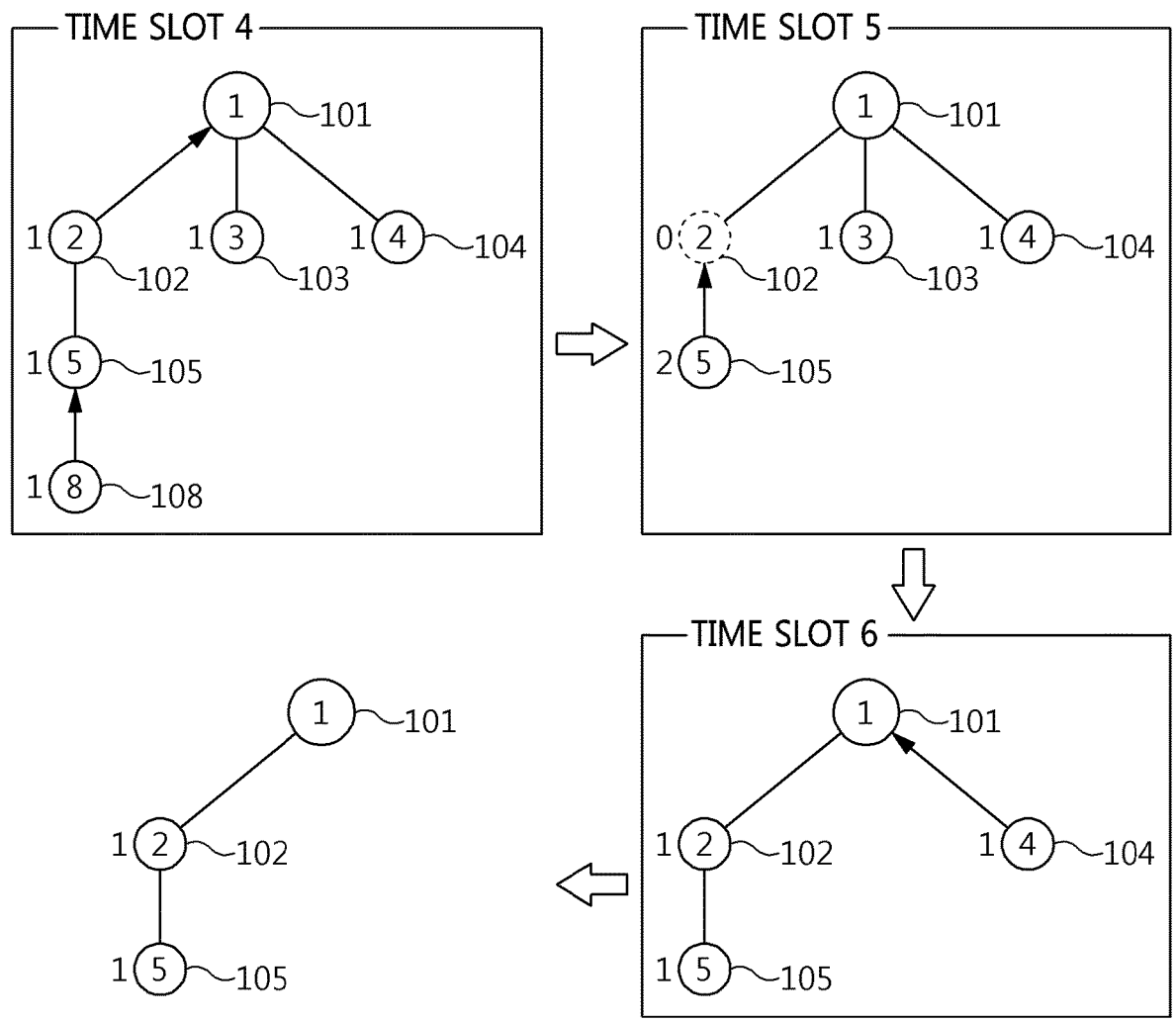
Figure 7:
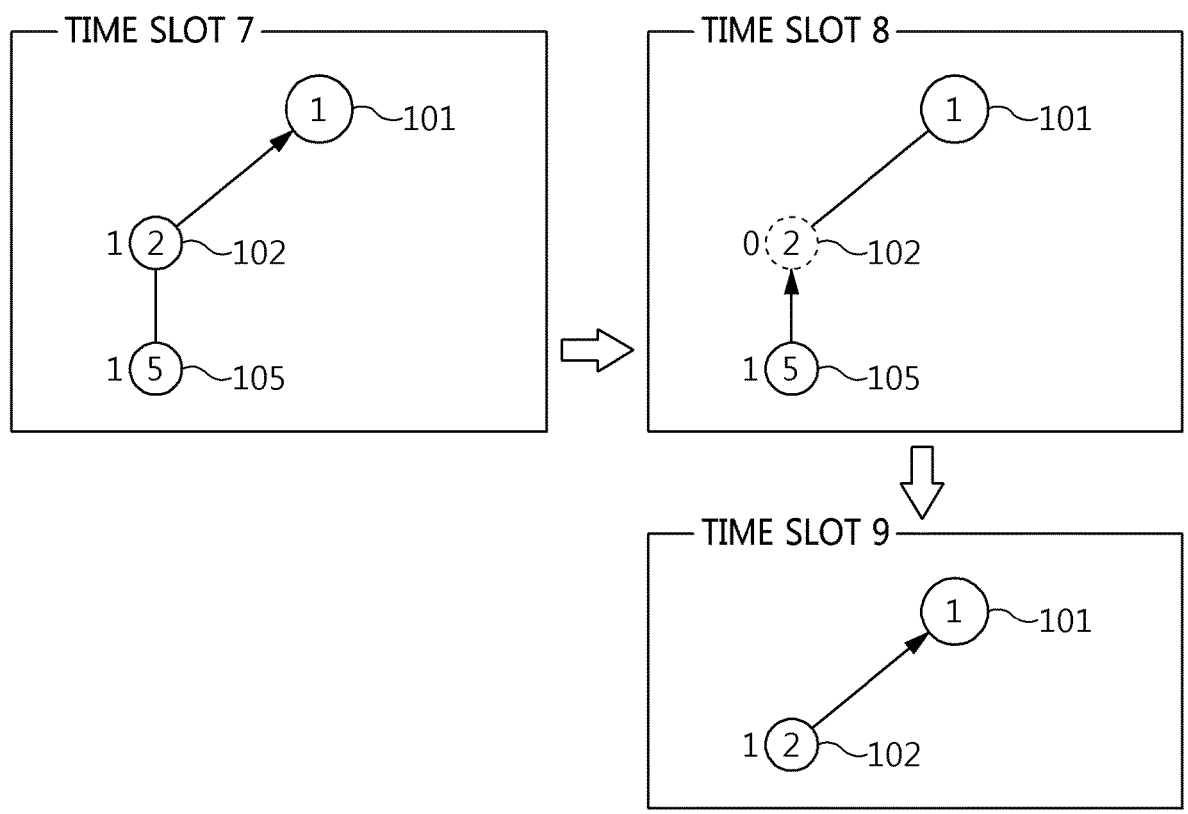

FIGS. 5 to 7 are diagrams illustrating a procedure for transmitting data depending on the schedule illustrated in FIG. 4.

The numeral in each node, illustrated in FIGS. 5 to 7, indicates the ID of the corresponding node, and the numeral on the left side of the node indicates the amount of data traffic to be transmitted from the corresponding node. Also, among nodes from which the amount of data traffic to be transmitted is '0', leaf nodes may be omitted, and nodes, which are not omitted, may be indicated by dotted lines.

Referring to FIG. 5, in time slot 1, each of nodes 2 102 to 9 109 has data traffic of 1, and the node 2 102, the node 6 106, the node 7 107, and the node 8 108 transmit data to parent nodes thereof through transmission channels respectively assigned thereto depending on the transmission schedule in the time slot 1.

After the time slot 1 has passed, the data traffic of each of the node 2 102, the node 6 106, the node 7 107, and the node 8 108 becomes '0'. Among these nodes, the node 6 106 and the node 7 107 may be omitted because they are leaf nodes. Further, since the node 3 103, the node 4 104, and the node 5 105 receive data from child nodes thereof, the data traffic of each of the nodes 3, 4, and 5 becomes '2'.

Also, the node 3 103, the node 5 105, and the node 9 109 may transmit data to parent nodes thereof through transmission channels respectively assigned thereto depending on the transmission schedule in the time slot 2.

After the time slot 2 has passed, the data traffic of each of the node 3 103 and the node 5 105 becomes '1', and the data traffic of the node 9 109 becomes '0', and then the node 9 109 may be omitted. Also, the data traffic of each of the node 2 102 and the node 8 108 becomes '1'.

Further, the node 4 104 transmits data to the parent node thereof through the transmission channel assigned thereto depending on the transmission schedule in the time slot 3.

After the time slot 3 has passed, the data traffic of the node 4 104 becomes '1'.

That is, when the time slot 1 to time slot 3 have passed in the quarter 1, all nodes perform data transmission once, and the data traffic of each of the node 6 106, the node 7 107, and the node 9 109, which are leaf nodes in the quarter 1, becomes '0'. Furthermore, the data traffic of each of the node 2 to the node 5 and the node 8 (nodes 102 to 105 and 108) becomes '1'.

Referring to FIG. 6, in time slot 4, each of the node 2 102 to node 5 105 and the node 8 108 has data traffic of 1, and the node 2 102 and the node 8 108 may transmit data to parent nodes thereof through transmission channels respectively assigned thereto depending on the transmission schedule in the time slot 4.

After the time slot 4 has passed, the data traffic of each of the node 2 102 and the node 8 108 becomes '0'. Of the nodes, the node 8 108 is a leaf node, and thus the node 8 may be omitted. Also, the node 5 105 receives data from the child node thereof, and thus the data traffic of the node 5 105 becomes '2'.

Further, the node 3 103 and the node 5 105 transmit data to parent nodes thereof through transmission channels respectively assigned thereto depending on the transmission schedule in the time slot 5.

After the time slot 5 has passed, each of the node 2 102 and the node 5 105 has data traffic of '1'. Also, the node 3 103 has data traffic of '0', and may be omitted because the node 3 103 is a leaf node.

Next, the node 4 104 transmits data to the parent node thereof through a transmission channel assigned thereto depending on the transmission schedule in time slot 6.

After the time slot 6 has passed, the node 4 104 has data traffic of '0', and may be omitted because the node 4 104 is a leaf node.

That is, after the time slot 4 to the time slot 6 have passed in quarter 2, all nodes perform data transmission once, and the data traffic of each of the node 3 103, the node 4 104, and the node 8 108, which are leaf nodes in the quarter 2, become '0'. Also, the data traffic of each of the node 2 102 and the node 5 105 becomes '1'.

Referring to FIG. 7, the data traffic of each of the node 2 102 and node 5 105 becomes '1' in time slot 7, and the node 2 102 transmits data to the parent node thereof through a transmission channel assigned thereto depending on the transmission schedule in the time slot 7.

After the time slot 7 has passed, the data traffic of the node 2 102 becomes '0'.

Further, the node 5 105 transmits data to the parent node thereof through a transmission channel assigned thereto depending on the transmission schedule in time slot 8.

After time slot 8 has passed, the node 2 102 has data traffic of '1', and the node 5 105 has data traffic of 0, and then may be omitted because the node 5 105 is a leaf node.

Also, the node 2 102 transmits data to the parent node thereof through the transmission channel assigned thereto depending on the transmission schedule in time slot 9.

After time slot 9 has passed, the node 2 102 has data traffic of '0', and may be omitted because the node 2 102 is a leaf node.

That is, after the time slots 7 to 9 have passed in quarter 3, all nodes perform data transmission once, and the data traffic of all nodes except the root node 101 becomes '0', and thus the transmission procedure may be completed without collisions or interference between nodes.

Figure 8:
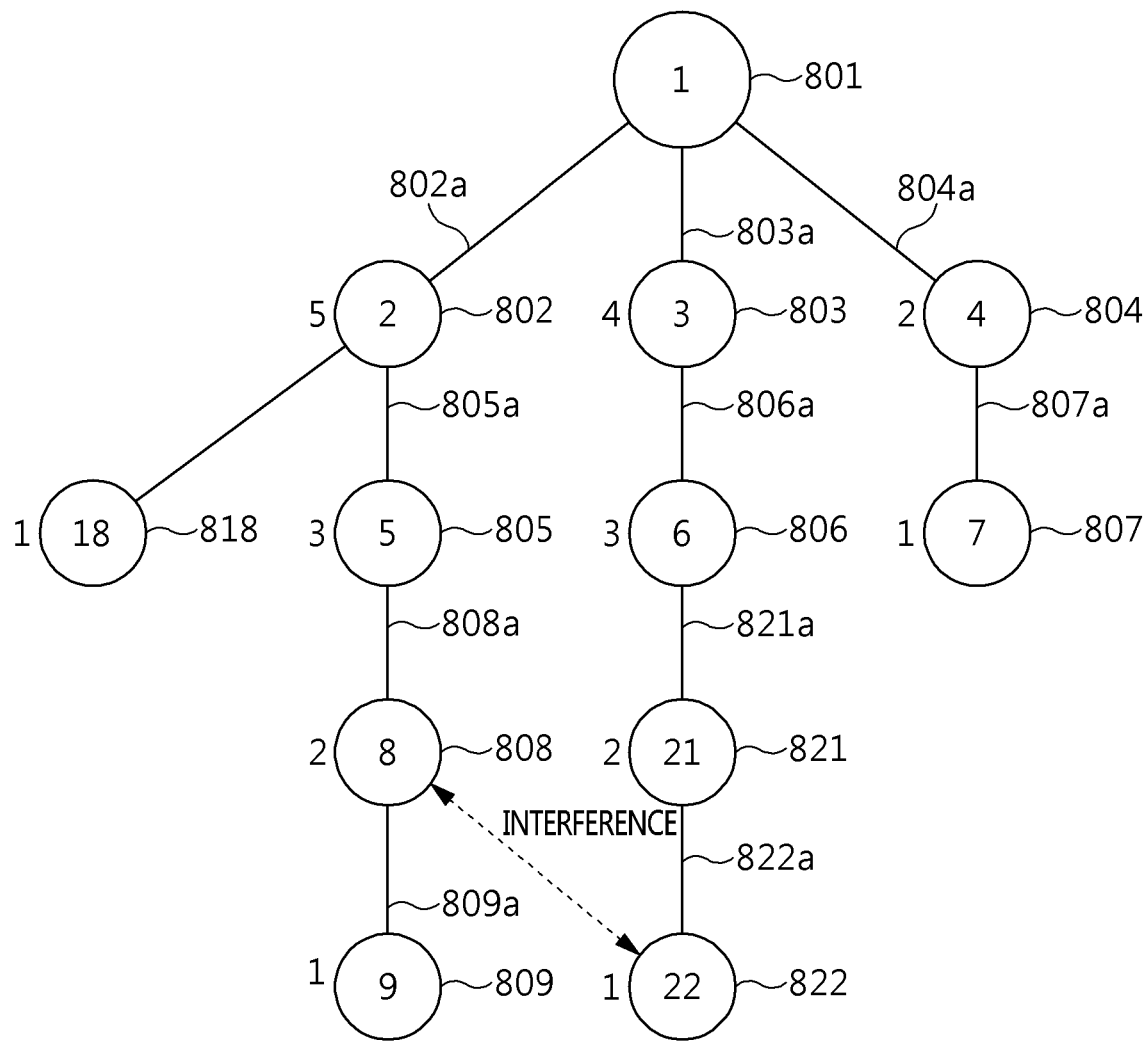

FIGS. 8 and 9 are diagrams illustrating a system using a dynamic scheduling method for guaranteeing QoS depending on network transmission traffic according to another embodiment of the present invention and a data transmission schedule based on the system.

Referring to FIG. 8, node 18 818, node 21 821, and node 22 822 are added to the example of FIG. 1. A parent node of the node 18 818 is node 2 802, a parent node of the node 21 821 is node 6 806, and a parent node of the node 22 822 is the node 21 821.

The numeral in each node illustrated in FIG. 8 indicates the ID of the corresponding node, and the numeral on the left side of the node indicates a data traffic volume, which is the sum of the amount of data that is received from descendant nodes and is to be transmitted to a root node and the amount of data that is to be transmitted from the corresponding node to the root node.

The larger the data traffic volume, the higher the priority for time slot assignment that may be set in each quarter.

Here, when the priority for time slot assignment is set depending on the data traffic volume, the priority that is assigned may become higher in the sequence of node 2, node 3, node 5, node 6, node 4, node 8, node 21, node 7, node 9, node 18, and node 22.

Referring to the IEEE 802.15.4 standard when transmission channels are assigned to respective nodes, the total number of channels is 16, and thus channels ranging from #0 to #15 may be present.

Here, when the transmission channel is assigned to each node, a transmission channel having a channel number identical to the ID of a parent node of the corresponding node may be assigned. Also, when the ID of the parent node is equal to or greater than 16, which is the total number of channels, the transmission channel may be replaced with a channel having a channel number corresponding to the remainder that is obtained when the ID of the parent node is divided by 16.

That is, channel #1 may be assigned as the transmission channel 802a of the node 2 802, may be assigned as the transmission channel 803a of the node 3 803, and may be assigned as the transmission channel 804a of the node 4 804. Also, channel #2 may be assigned as the transmission channel 805a of the node 5 805, channel #3 may be assigned as the transmission channel 806a of the node 6 806, channel #4 may be assigned as the transmission channel 807a of the node 7 807, and channel #5 may be assigned as the transmission channel 808a of the node 8 808. Also, channel #8 may be assigned as the transmission channel 809a of the node 9 809, the channel #2 may be assigned as the transmission channel 818a of the node 18 818, channel #6 may be assigned as the transmission channel 821a of the node 21 821, and the channel #5 may be assigned as the transmission channel 822a of the node 22 822.

Referring to FIG. 9, when time slots are assigned in quarter 1 using priorities for time slot assignment and the assigned channel information, time slot 1 is assigned to the node 2 802, the node 6 806, the node 7 807, the node 8 808, and the node 22 822. Further, time slot 2 is assigned to the node 3 803, the node 5 805, the node 9 809, and the node 21 821, and time slot 3 is assigned to the node 4 804 and the node 18 818.

Here, nodes higher than the node 8 808 and the node 22 822 are the node 5 805 and the node 21 821, respectively. However, the total number of channels is 16, and there are channels from #0 to #15, and thus the same channel, that is, channel #5, is assigned to the node 8 808 and the node 22 822. Therefore, since the node 8 808 and the node 22 822 transmit data through the same channel #5 in the same time slot #1, interference or a collision may occur. Therefore, there is a need to schedule data transmission while avoiding interference.

FIG. 10 is a diagram illustrating an example in which the system using a dynamic scheduling method for guaranteeing QoS depending on network transmission traffic, illustrated in FIGS. 8 and 9, avoids interference and performs scheduling.

Referring to FIG. 10, the system using a dynamic scheduling method for guaranteeing QoS depending on network transmission traffic according to the embodiment of the present invention may change time slots assigned to nodes between which interference or a collision occurs so as to avoid interference when interference occurs between nodes upon scheduling data transmission.

According to the schedule illustrated in FIG. 9, the node 8 and the node 22 transmit data through the same channel #5 in the same time slot #1, and thus a problem may arise in that interference or a collision occurs. Therefore, the problem of a collision or interference may be avoided by changing the time slot assigned to the node 22, which is one of nodes in which a collision occurs.

The node 22 uses the channel #5, and, in this case, the problem of a collision with the node 8 may occur in the time slot #1 and the problem of a collision with the node 5 may occur in the time slot #2, and thus the problem of interference or a collision may be avoided by assigning the time slot #3 to the node 22.

In this case, each quarter may include sufficient spare time slots so as to avoid the problem of interference or a collision.

The number of spare time slots included so as to avoid the problem of interference or a collision may be optimized for each quarter, and may then differ for each quarter.

In a selective embodiment, when the node 8 and the node 22 cannot successfully transmit data due to a collision or interference in an n-th slot frame at the time of transmitting data depending on the preset schedule, it may be determined that a schedule overlapping is present, and then retransmission may be prepared for. Here, retransmission may be actually performed through the channel #5 in the time slot #4, which is a spare time slot.

Here, the node 8 having higher priority for time slot assignment attempts retransmission first, and a schedule for the node 22 having lower priority for time slot assignment may be assigned to channel #5 in time slot #3 in quarter 1 in an (n+1)-th slot frame. Further, the node 8 which has successfully completed retransmission may perform again a data transmission schedule through channel #5 in time slot #1 in quarter 1 in the (n+1)-th slot frame without changing the existing schedule.

In this way, when spare time slots are included in each quarter and a collision or interference occurs in data transmission, the assigned time slot may be changed, and thus the problem of a collision or interference that may occur in data transmission may be effectively avoided and solved.

FIG. 11 is a diagram illustrating another example in which the system using a dynamic scheduling method for guaranteeing QoS depending on network transmission traffic, illustrated in FIGS. 8 and 9, avoids interference and performs scheduling.

Referring to FIG. 11, when interference occurs in the scheduling of data transmission, the system using a dynamic scheduling method for guaranteeing QoS depending on network transmission traffic according to the embodiment of the present invention may change any of transmission channels assigned to nodes between which interference or a collision occurs in order to avoid the interference.

According to the schedule illustrated in FIG. 9, node 8 and node 22 transmit data through the same channel #5 in the same time slot #1, and thus a problem may arise in that interference or a collision occurs. Therefore, the problem of a collision or interference may be avoided by changing the transmission channel assigned to the node 22, which is one of nodes between which the collision occurs.

The node 22 uses the channel #5 in the time slot #1, and in this case, the problem of a collision with node 8 may occur in the time slot #1. Therefore, the problem of interference or a collision may be avoided by assigning channel #2, which is a transmission channel in which collisions with other nodes do not occur in the time slot #1, to the node 22.

In this case, each quarter may include sufficient spare time slots so as to avoid the problem of interference or a collision.

The number of spare time slots included so as to avoid the problem of interference or a collision may be optimized for each quarter, and may then differ for each quarter.

When a transmission channel is changed and assigned, a channel having the smallest channel number, among transmission channels in which interference or a collision does not occur, may be primarily assigned.

Here, when the transmission channel is changed, the channel corresponding to the ID of the node in which interference or a collision has occurred, the channel corresponding to the ID of a parent node of the node in which interference or a collision has occurred, and the channel corresponding to the ID of the corresponding node itself may be excluded.

Also, in order to choose transmission channels to be excluded from the change of transmission channels, information about channels used by respective nodes to transmit data to parent nodes thereof may be received from neighboring nodes.

In this way, when spare time slots are included in each quarter and a collision or interference occurs in data transmission, the assigned transmission channel may be changed, and thus the problem of a collision or interference that may occur in data transmission may be effectively avoided and solved.

FIG. 12 is a diagram illustrating a method in which the system 1 using a dynamic scheduling method for guaranteeing QoS depending on network transmission traffic, illustrated in FIG. 1, sends an Enhanced Beacon (EB) message and Broadcast (BR) data.

Referring to FIG. 12, in the system 1 using a dynamic scheduling method for guaranteeing QoS depending on network transmission traffic, illustrated in FIG. 1, an Enhanced Beacon (EB) message contains important information for generating and controlling a network topology and routing information. Further, the EB message is periodically sent from a parent node to a descendant node at beacon intervals. When multiple nodes periodically send and receive beacon messages while booting in a large-scale wireless sensor network, a collision between packets may occur, and a bottleneck phenomenon may be caused, thus consequently not only resulting in a delay in the network join time of the corresponding node but also deteriorating network performance.

For this, as illustrated in FIG. 12, separately from quarters in which data is transmitted, a schedule for sending an EB message may be added to a quarter EB interval.

Here, each node may establish a channel using its node ID, and may send an EB message through the channel.

When there occurs a collision with an EB message which is sent from a neighboring node through the same channel, the EB message may be delayed (backed off) to a subsequent time slot, and may then be resent.

In this case, delay priority may vary depending on a hop count, a data transmission success rate, a data traffic volume, the number of child nodes, or the like.

Further, the EB message contains a portion indicating whether there is data to be transmitted in a quarter BR interval, and the data may be broadcasted in the quarter BR interval subsequent to the quarter EB interval if the portion indicates that there is the data to be transmitted.

Accordingly, neighboring nodes having received the EB message may decide whether to receive the broadcast data, thus reducing energy consumption and solving the problem of a broadcast storm by selectively using BR intervals.

Figure 13:
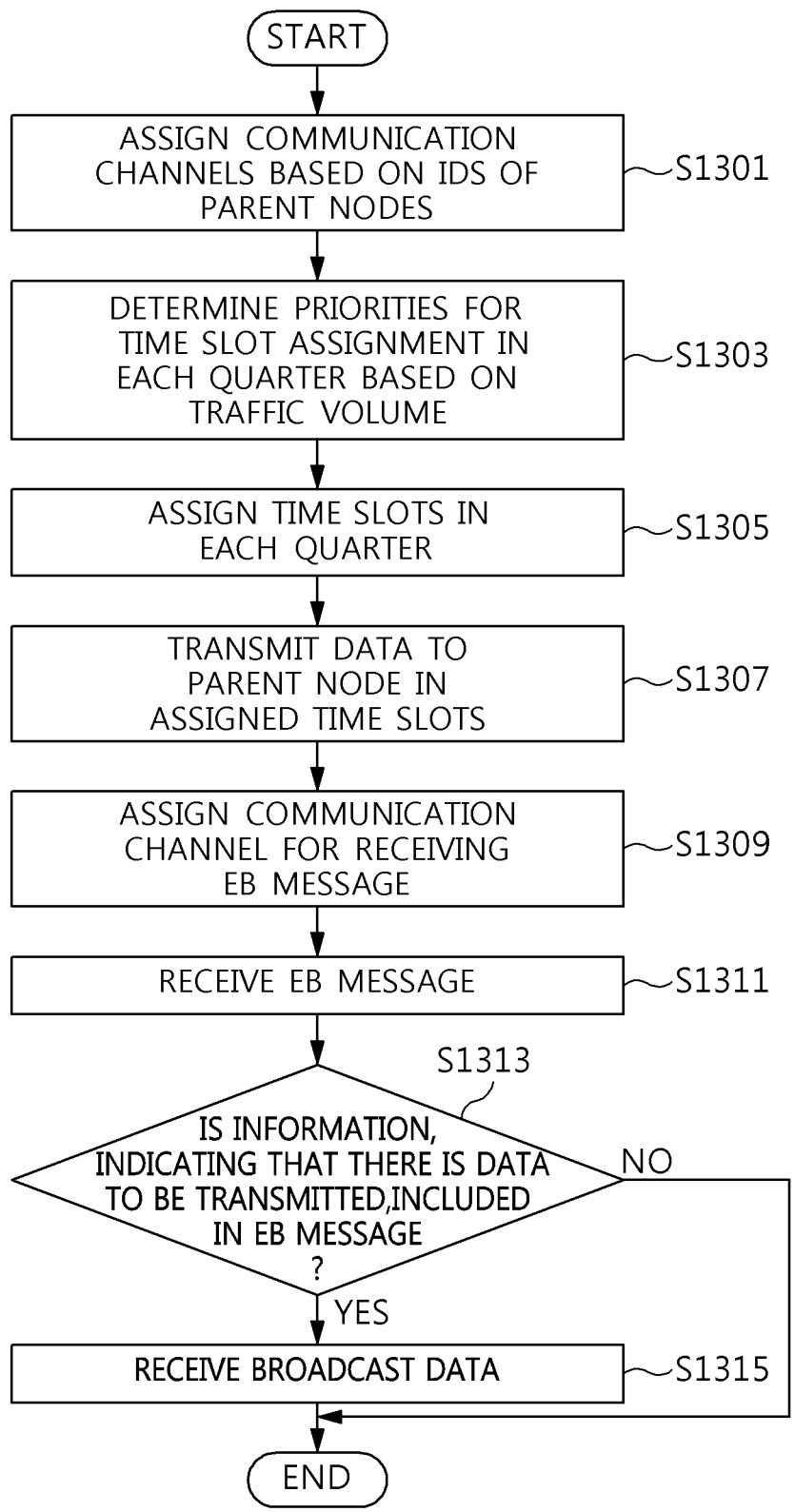
FIG. 13 is an operation flowchart illustrating a dynamic scheduling method for guaranteeing QoS depending on network transmission traffic according to an embodiment of the present invention.

FIG. 13 is an operation flowchart illustrating a dynamic scheduling method for guaranteeing QoS depending on network transmission traffic according to an embodiment of the present invention.

Referring to FIG. 13, the dynamic scheduling method for guaranteeing QoS depending on network transmission traffic according to the embodiment of the present invention assigns communication channels based on the IDs of parent nodes at step S1301.

Here, communication channels having channel numbers identical to the IDs of the parent nodes may be assigned.

When the total number of communication channels is set to N, a communication channel having a channel number identical to the remainder that is obtained by dividing each parent node ID by N may be assigned.

In particular, referring to the IEEE 802.15.4 standard, the total number of channels is 16, and channels ranging from #0 to #15 may be present. In this case, a channel having a channel number identical to the remainder that is obtained by dividing the parent node ID by 16 may be assigned.

Further, the dynamic scheduling method for guaranteeing QoS depending on network transmission traffic according to the embodiment of the present invention may set priorities for time slot assignment within each quarter, based on a data traffic volume obtained by summing the amount of data that is received from descendant nodes and is to be transmitted to a root node and the amount of data that is to be transmitted from the corresponding node itself to the root node at step S1303.

Here, the larger the data traffic volume, the higher the priority for time slot assignment that may be set.

That is, the highest priority for time slot assignment may be set for the node having the largest data traffic volume.

The total number of quarters may be identical to the largest data traffic volume.

Next, the dynamic scheduling method for guaranteeing QoS depending on network transmission traffic according to the embodiment of the present invention assigns time slots in each quarter at step S1305.

In this case, the time slots are sequentially assigned to nodes having priorities for time slot assignment in descending order of priority, and the assignment of time slots is performed such that interference or a collision with previously assigned transmission channels does not occur.

All nodes are each assigned one time slot within one quarter, and thus they may transmit data once within one quarter.

Next, the dynamic scheduling method for guaranteeing QoS depending on network transmission traffic according to the embodiment of the present invention transmits data to the parent node of the corresponding node in the assigned time slots at step S1307.

Further, the dynamic scheduling method for guaranteeing QoS depending on network transmission traffic according to the embodiment of the present invention assigns communication channels for receiving an EB message at step S1309.

Here, each communication channel for receiving an EB message may be assigned based on the ID of the corresponding node itself.

The communication channel for receiving an EB message may be assigned as a channel number identical to the ID of the corresponding node itself.

When the total number of communication channels is set to N, a communication channel having a channel number identical to the remainder that is obtained when the ID of the corresponding node is divided by N may be assigned.

Next, the dynamic scheduling method for guaranteeing QoS depending on network transmission traffic according to the embodiment of the present invention receives an EB message using the assigned communication channel for receiving the EB message at step S1311.

Here, the reception of the EB message may be performed in a quarter EB interval.

When a collision with a neighboring node occurs at the time of receiving an EB message, the EB message may be delayed (backed off) to a subsequent time slot, and may then be received again.

Further, the dynamic scheduling method for guaranteeing QoS depending on network transmission traffic according to the embodiment of the present invention determines whether information indicating whether there is data to be transmitted is contained in the EB message at step S1313.

If it is determined at step S1313 that the information indicating that there is data to be transmitted is contained in the EB message, broadcast data is received at step S1315.

If it is determined at step S1313 that information indicating that there is data to be transmitted is not contained in the EB message, broadcast data is not received.

Accordingly, a minimum number of time slots required in order to transmit and receive data may be assigned and used without interference or a delay, and thus a duty cycle may be minimized, with the result that power consumption may also be minimized.

Furthermore, neighboring nodes having received the EB messages may decide whether to receive broadcast data, thus reducing energy consumption and solving the problem of a broadcast storm by selectively using BR intervals.

Figure 14:
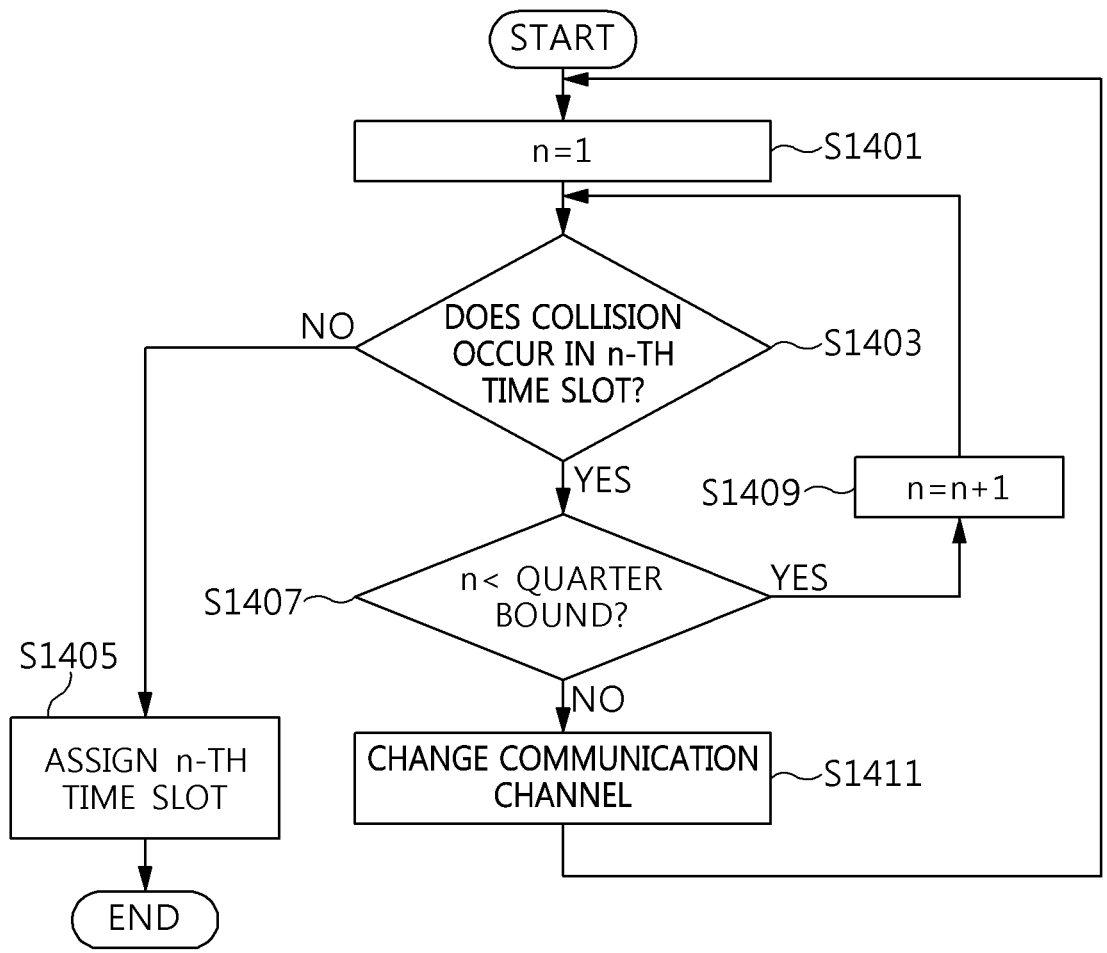
FIG. 14 is an operation flowchart illustrating an example of the time slot assignment step illustrated in FIG. 13.

FIG. 14 is an operation flowchart illustrating an example of the time slot assignment step 1305 illustrated in FIG. 13.

Referring to FIG. 14, in a procedure at time slot assignment step S1305, illustrated in FIG. 13, 'n', corresponding to the index of each time slot, is set to '1' at step S1401.

Further, in the procedure at time slot assignment step S1305 illustrated in FIG. 13, when a previously assigned transmission channel is used in an n-th time slot, whether interference or a collision occurs is determined at step S1403.

If it is determined at step S1403 that interference or a collision does not occur in the n-th time slot, the n-th time slot is assigned at step S1405.

If it is determined at step S1403 that interference or a collision occurs in the n-th time slot, whether 'n' falls within a quarter bound corresponding to a current quarter is determined at step S1407. In other words, whether the n-th time slot is the last time slot in the current quarter is determined.

Here, in each quarter, spare time slots needed to change and assign a time slot when the problem of a collision or interference occurs may be included.

Also, the number of spare time slots to be included in each quarter may be optimized and may differ for each quarter.

If it is determined at step S1407 that 'n' falls within the quarter bound corresponding to the current quarter, a subsequent time slot still remains, and thus the value of the time slot index 'n' is increased by '1' at step S1409. Then, the process returns to step S1403 of determining whether the problem of a collision or interference occurs.

If it is determined at step S1407 that 'n' does not fall within the quarter bound corresponding to the current quarter, the n-th time slot is the last time slot in the current quarter. In this case, regardless of which time slot is assigned, it is impossible to avoid the occurrence of a collision or interference with other nodes. Accordingly, the communication channel is changed at step S1411, and the process returns to step S1401 of determining again whether a collision or interference occurs from the first time slot.

When the communication channel is changed, a transmission channel corresponding to the ID of the corresponding node, a transmission channel corresponding to the ID of a parent node of the corresponding node, and a transmission channel corresponding to the ID of a node which causes a collision or interference with the corresponding node may be primarily excluded.

Accordingly, either a time slot or a communication channel is changed in order to solve the problem of a collision or interference that may occur in data transmission, so that all nodes may transmit data without collisions in each quarter, thus removing a delay time and preventing data loss.

Specific executions, described in the present invention, are only embodiments, and are not intended to limit the scope of the present invention using any methods. For the simplification of the present specification, a description of conventional electronic components, control systems, software, and other functional aspects of systems may be omitted. Further, connections of lines between components shown in the drawings or connecting elements therefor illustratively show functional connections and/or physical or circuit connections. In actual devices, the connections may be represented by replaceable or additional various functional connections, physical connections or circuit connections. Further, unless a definite expression, such as "essential" or "importantly," is specifically used in context, the corresponding component may not be an essential component for the application of the present invention.

In accordance with the present invention, by means of the coloring-based dynamic distributed scheduling method and the system using the method, collisions and interference may be removed when a large number of multi-hop nodes configured in a large-scale IoT environment desire to transmit data to a root node, thus enabling communication between nodes to be efficiently performed.

Further, by means of the coloring-based dynamic distributed scheduling method and the system using the method, a transmission delay time may be decreased and a transmission success rate may be improved by dividing quarters according to the amount of network transmission traffic while collisions and interference, occurring in transmission, may be avoided and data may be transmitted without overlapping by separating time and channels based on coloring.

Therefore, the spirit of the present invention should not be defined by the above-described embodiments, and it will be apparent that all matters disclosed in the accompanying claims and equivalents thereof are included in the scope of the spirit of the present invention.

What is claimed is:

1. A dynamic scheduling method for guaranteeing Quality of Service (QoS) depending on network transmission traffic, comprising:
   assigning communication channels to respective nodes based on Identifications (IDs) of parent nodes corresponding to the respective nodes;
   determining priorities for assignment of time slots to the respective nodes in each quarter based on data traffic volumes corresponding to the respective nodes, a frame length being divided into a plurality of quarters, each quarter including multiple time slots; and
   assigning time slots to the respective nodes in each quarter depending on the determined priorities for assignment of the time slots,
   wherein the dynamic scheduling method further comprises:
   assigning communication channels to the respective nodes so as to receive an Enhanced Beacon (EB) message in a quarter assigned to the EB message, separate from existing quarters in which data is transmitted; and
   allowing each of the nodes to receive an EB message from a parent node corresponding thereto through the assigned communication channel,
   wherein assigning the time slots comprises sequentially determining, for a target node, whether a communication collision occurs in multiple time slots from a first time slot in a target quarter, and assigning an earliest time slot in which a communication collision does not occur to the target node, and
   wherein the dynamic scheduling method further comprises:
   when two or more target nodes interfere with each other using an identical channel in an identical time slot in an identical target quarter, changing and assigning one or more of communication channels and time slots that are assigned to the interfering target nodes.

2. The dynamic scheduling method of claim 1, wherein assigning the time slots comprises assigning the time slots such that a collision between neighboring communication channels does not occur by applying graph coloring to the communication channels.

3. The dynamic scheduling method of claim 1, wherein:
   the target quarter comprises one or more spare time slots for avoiding interference, and
   changing and assigning the one or more of the communication channels and the time slots comprises assigning different time slots to the interfering target nodes using the spare time slots.

4. The dynamic scheduling method of claim 1, wherein changing and assigning the one or more of the communication channels and the time slots comprises, when two or more target nodes interfere with each other using an identical channel in an identical time slot in an identical target quarter, assigning different communication channels to the interfering target nodes.

5. The dynamic scheduling method of claim 4, wherein changing and assigning the one or more of the communication channels and the time slots comprises, when the different communication channels are assigned to the interfering target nodes, assigning the different communication channels to the interfering target nodes using communication channels other than existing communication channels of the interfering target nodes and existing communication channels of parent nodes of the interfering target nodes.

6. The dynamic scheduling method of claim 1, further comprising:
   when information, indicating that there is data to be transmitted in a quarter assigned for Broadcast (BR), is included in the EB message, receiving broadcast data corresponding to the data to be transmitted in the quarter for BR.

7. The dynamic scheduling method of claim 1, wherein determining the priorities for assignment of time slots comprises determining a priority for assignment of time slots to a higher level as a data traffic volume corresponding to each node is larger.

8. The dynamic scheduling method of claim 7, wherein assigning the time slots comprises assigning the time slots such that each node performs transmission once or less in each quarter.

9. A system using a dynamic scheduling method for guaranteeing Quality of Service (QoS) depending on network transmission traffic, wherein the dynamic scheduling method is configured to:
   assigning communication channels to respective nodes based on Identifications (IDs) of parent nodes corresponding to the respective nodes, determining priorities for assignment of time slots to the respective nodes in each quarter based on data traffic volumes corresponding to the respective nodes, a frame length being divided into a plurality of quarters, each quarter including multiple time slots, and assigning time slots to the respective nodes in each quarter depending on the determined priorities for assignment of the time slots, wherein the dynamic scheduling method is configured to:

assigning communication channels to the respective nodes so as to receive an Enhanced Beacon (EB) message in a quarter assigned to the EB message, separate from existing quarters in which data is transmitted; and allowing each of the nodes to receive an EB message from a parent node corresponding thereto through the assigned communication channel, wherein the time slots are assigned by sequentially determining, for a target node, whether a communication collision occurs in multiple time slots from a first time slot in a target quarter, and by assigning an earliest time slot in which a communication collision does not occur to the target node, and wherein the dynamic scheduling method is configured to, when two or more target nodes interfere with each other using an identical channel in an identical time slot in an identical target quarter, change and assign one or more of communication channels and time slots that are assigned to the interfering target nodes.

10. The system of claim 9, wherein the time slots are assigned such that a collision between neighboring communication channels does not occur by applying graph coloring to the communication channels.

11. The system of claim 9, wherein:

the target quarter comprises one or more spare time slots for avoiding interference, and the dynamic scheduling method is configured to assign different time slots to the interfering target nodes using the spare time slots.

12. The system of claim 9, wherein the dynamic scheduling method is configured to, when two or more target nodes interfere with each other using an identical channel in an identical time slot in an identical target quarter, assign different communication channels to the interfering target nodes.

13. The system of claim 12, wherein the dynamic scheduling method is configured to, when the different communication channels are assigned to the interfering target nodes, assign the different communication channels to the interfering target nodes using communication channels other than existing communication channels of the interfering target nodes and existing communication channels of parent nodes of the interfering target nodes.

14. The system of claim 9, wherein the dynamic scheduling method is configured to:

when information, indicating that there is data to be transmitted in a quarter assigned for Broadcast (BR), is included in the EB message, receive broadcast data corresponding to the data to be transmitted in the quarter for BR.

15. The system of claim 9, wherein the priorities for assignment of time slots are determined such that a priority for assignment of time slots is determined to a higher level as a data traffic volume corresponding to each node is larger.

16. The system of claim 15, wherein the time slots are assigned such that each node performs transmission once or less in each quarter.

17. A dynamic scheduling method for guaranteeing Quality of Service (QoS) depending on network transmission traffic, the method comprising:

assigning communication channels to respective nodes based on Identifications (IDs) of parent nodes corresponding to the respective nodes;

determining priorities for assignment of time slots to the respective nodes in each quarter based on data traffic volumes corresponding to the respective nodes, a frame length being divided into a plurality of quarters, each quarter including multiple time slots;

assigning time slots to the respective nodes in each quarter depending on the determined priorities for assignment of the time slots; and when two or more target nodes interfere with each other using an identical channel in an identical time slot in an identical target quarter, changing and assigning one or more of communication channels and time slots that are assigned to the interfering target nodes, wherein assigning the time slots comprises sequentially determining, for a target node, whether a communication collision occurs in multiple time slots from a first time slot in a target quarter, and assigning an earliest time slot in which a communication collision does not occur to the target node.

* * * * *